DECIMAL ACCUMULATING SHIFT REGISTER

Filed March 30, 1959 4 Sheets-Sheet 1

INVENTORS.
SIDNEY N. EINHORN
JOHN R. VAN ANDEL
BY James J. Wood
ATTORNEY

| CONTENTS OF REGISTER | | | | | | |
|---|---|---|---|---|---|---|
| | 1ST STAGE | | 2ND STAGE | | 3RD STAGE | |
| | PRI. | SEC. | PRI. | SEC. | PRI. | SEC. |
| REGISTER CLEARED | 0 | 0 | 0 | 0 | 0 | 0 |
| 387 INSERTED | 3 | 0 | 8 | 0 | 7 | 0 |
| 1ST SHIFT A | 3 | 3 | 8 | 8 | 7 | 7 |
| 2ND SHIFT B | 7 | 3 | 3 | 8 | 8 | 7 |

Fig. 3

| CONTENTS OF REGISTER | | | | | |
|---|---|---|---|---|---|
| EXAMPLE 1 | 1ST STAGE | | 2ND STAGE | | 3RD STAGE |
| | PRI. | SEC. | PRI. | SEC. | PRI. |
| REGISTER CLEARED | 0 | 0 | 0 | 0 | 0 |
| FIRST NUMBER (387) INSERTED | 3 | 0 carry | 8 | 0 | 7 |
| SECOND NUMBER (431) INSERTED | 7 carry | 1 | 1 | 0 | 8 |
| 9 "a" PULSES APPLIED | 8 | 0 | 1 | 9 | 8 |
| SEC. COUNT CORES CLEARED | 8 | 0 | 1 | 0 | 8 |
| EXAMPLE 2 | | | | | |
| REGISTER CLEARED | 0 | 0 | 0 | 0 | 0 |
| FIRST NUMBER (899) INSERTED | 8 | 0 | 9 | 0 carry | 9 |
| SECOND NUMBER (001) INSERTED | 8 | 0 | 9 carry | 1 | 0 |
| 9 "a" PULSES APPLIED | 8 | 9 carry | 9 | 0 | 0 |
| | 8 carry | 9 | 0 | 0 | 0 |
| | 9 | 0 | 0 | 0 | 0 |

Fig. 5

INVENTORS
SIDNEY N. EINHORN
JOHN R. VAN ANDEL
BY James J. Wood
ATTORNEY

March 7, 1961 S. N. EINHORN ET AL 2,973,902

DECIMAL ACCUMULATING SHIFT REGISTER

Filed March 30, 1959 4 Sheets-Sheet 3

INVENTORS.
SIDNEY N. EINHORN
JOHN R. VAN ANDEL

BY James J. Ward
ATTORNEY

March 7, 1961 S. N. EINHORN ET AL 2,973,902

DECIMAL ACCUMULATING SHIFT REGISTER

Filed March 30, 1959 4 Sheets-Sheet 4

INVENTORS.
SIDNEY N. EINHORN
JOHN R. VAN ANDEL

BY James J. Wood

ATTORNEY

United States Patent Office 2,973,902
Patented Mar. 7, 1961

2,973,902

DECIMAL ACCUMULATING SHIFT REGISTER

Sidney N. Einhorn, Philadelphia, Pa., and John R. Van Andel, Dearborn, Mich., assignors to Burroughs Corporation, Detroit, Mich., a corporation of Michigan Filed Mar. 30, 1959, Ser. No. 802,902
11 Claims. (Cl. 235—173)

This invention relates to an electronic register, and more specifically to a register for utilization in an electronic computer, which register is capable of performing the operations of shifting and/or accumulating the word intelligence, stored therein.

In the computer art, a bit or character is a signal, usually a pulse or a train of pulses, utilized to convey a unit of intelligence, a collection of bits being dominated a word. The word in the digital computer art has at least one meaning and is stored and transferred by the computer circuit as a unit.

A register is a short access time memory device for storing one or more words. In its broadest sense, the register may be, and frequently is, used for performing both arithmetic and control functions.

The register of this invention is a decimal register in the sense that the digital information with which it treats is written in numeral form with a radix of 10. The operations of shifting and/or accumulating are performed in the practice of this invention so that the register may be called a decimal shifting register or a decimal accumulator or where both functions are practiced it may be denominated an accumulating shifting decimal shift register.

The operations of shifting and accumulating are different and must be performed as discrete steps. Shifting may be defined as the process of translating the bits comprising a word, in a columnwise stepped direction to the right or left. Generally speaking, in the case of a number, this is equivalent to multiplying or dividing by a power of the base or radix of notation (usually two or ten). However, as will be made clear as this description proceeds, it is possible to provide a shift-around register so that both multiplication and division are possible by always shifting in the same direction, so that $(m-1)$ shifts to the right are equivalent to one shift to the left, where $m$ is the number of stages of the register. While the operations of multiplication and division are discussed supra in connection with the operation of the register, it is also within contemplation of this invention to shift the bits within the register as a desired operation per se without relation to multiplication or division.

The operation of accumulating may best be understood by considering the process of addition. In well known notation, the first of two numbers to be added is called the augend, and the second is the addend, the result being the sum. A group of numbers to be summed no matter what the mechanics for performing this operation, is no more than the successive addition of two numbers at a time.

In the computer art, in the process of performing addition, the augend and addend are fed to an adder in various ways, serial, parallel, or serial parallel, suitable provision being made for carries. The result of this particular operation is frequently temporarily stored in a register (for one reason the entire operation may not be complete), which is aptly called the augend register. When a sum is connected back to an augend register, so that successive additions with different addends accumulate the result in the augend register, such a register is therefore known as an accumulator and the process is described as that of accumulating.

In the electronic computer art there is a perennial need for circuitry which may be contained in small compact units, and which will perform as many of the numerous operations required of modern computers as is feasible. Usually the considerations involved are diametrically opposed, so that a choice must be made among alternative solutions, no one of which is wholly satisfactory. The instant invention is addressed to certain aspects of this overall problem, particularly as regards the function of shifting a computer word in a register, and the function of accumulating successive additions therein.

In accordance with a preferred embodiment, there is provided a decimal accumulating shift register comprising a plurality of stages 1, 2, 3 . . . $(m-1)$, $m$ each of said stages comprising a primary magnetic count core and a secondary magnetic count core. Each core has multiple stable states and is capable of being switched from one state of saturation called reset, to the other state of saturation called set, in a predetermined number of steps, a discrete step representing a digit bit $n$ where $n$ may have any value 0, 1, 2, . . . 9. Input signal means $i_1$, $i_2$, . . . $i_m$ are coupled to said primary count cores 1, 2, . . . $m$ respectively for storing a word of $m$ bits in said register. Input means "$a$" are coupled to said secondary magnetic count cores 1, 2, 3, . . . $(m-1)$. An enable gate A is coupled between a primary magnetic count core and a secondary magnetic count core in the same stage, and an enable gate B is coupled between a secondary count core in the $(m-1)^{th}$ stage and the primary count core in the $m^{th}$ stage, including an enable gate B between the $m^{th}$ stage secondary count core and the primary magnetic count core of the first stage, the whole being arranged to form a closed shift loop. Means are provided for applying timed pulses to said primary and secondary magnetic count cores during a shifting operation, the time interval of the first ten pulses being defined as enable step A, the time interval for the second ten pulses being defined as enable step B. Means are included for enabling gate A and inhibiting gate B during enable step A, and conversely during enable step B, whereby in a shifting operation during enable step A, in a given stage, the $(10-n)^{th}$ pulse to the primary count core in said stage, resets the latter core and also the secondary count core, the remaining $n$ pulses storing the number $n$ in both primary and secondary magnetic count cores, and during enable step B, the $(10-n)^{th}$ pulse provides a signal through enable gate B, resetting the secondary magnetic count core and the primary magnetic count core to which it is coupled, the remaining pulses resulting in a bit shift by the storing of any digit $n$ in a secondary count core and in the adjacent primary magnetic count core in the direction of loop shift. Delay gating means responsive only to a carry signal "1" couple primary magnetic count core with an $(m-1)$ secondary count core in a unidirectional shift. Means to enable and disable said delay gating means, during an addition operation are included, whereby upon the successive insertion of two words for purposes of addition, a carry signal "1" is produced from an $m^{th}$ primary counter to an $(m-1)^{th}$ secondary counter upon the application of any tenth pulse to a primary core, and upon the application of nine pulses to said input means "$a$," a carry signal "1" is produced whenever any magnetic core receives a tenth pulse. The delay gating means provides a predetermined time delay to permit completion of the set and reset cycles of the counting cores before the transmission of said carry signal "1." In this manner the bits stored in the primary count cores represent the sum of the two successive words applied to the register, the operations of shifting and accumulating being performed as separate steps.

Accordingly, it is an object of this invention to provide an improved register which is capable of both shifting and/or accumulating bit words with a minimum number of components.

A further object is to provide an improved register of reliable operation and which may be packaged as a small compact unit.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figs. 2 and 3 are utilized in explaining the operation of the decimal shift register of Fig. 1;

Fig. 5 is a diagram used in explaining the operation of the improved accumulator of Fig. 4.

Figure 1:
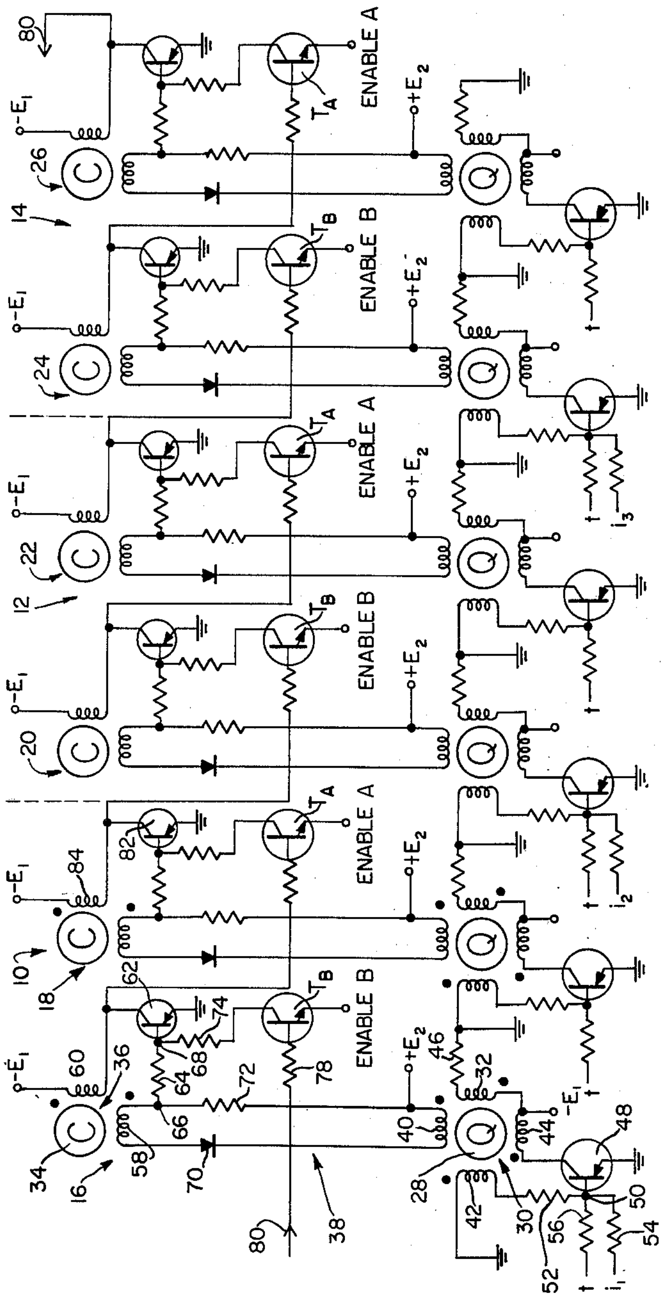
Fig. 1 is a circuit diagram of an improved decimal shift register in accordance with the invention.

Referring now to Fig. 1, there is disclosed a decimal shift register having *m* stages, each stage comprising a primary counter and a secondary counter. For purposes of illustration, the register of Fig. 1 is a three stage device comprising first, second, and third stages, indicated generally 10, 12, and 14 respectively. The first stage 10 comprises primary counter indicated generally at 16 and secondary counter indicated generally at 18; the second stage 12 comprises primary counter indicated generally at 20 and a secondary counter indicated generally at 22, and the third stage 14 comprises a primary counter indicated generally at 24 and a secondary counter indicated generally at 26.

The register of Fig. 1 utilizes as one of its components, the multiple state magnetic step counter which is disclosed and claimed in the pending patent application of Tung Chang Chen and Robert A. Tracy, entitled "Magnetic Device," bearing Serial No. 498,257, filed on March 31, 1955, and assigned to the assignee of the instant application.

In the application of Chen and Tracy supra, there is shown and described a circuit employing a pair of magnetic cores, each core having a substantially rectangular hysteresis loop characteristic. One of these cores, referred to in said application as a quantizing core (Q) functions as a bistable device. The switching of the quantizing core (Q) from one of its bistable states $-\phi r$ (called the reset state) to its other bistable state $+\phi r$ (called the set state), serves to step another core, called a count core (C), from one state of saturation to the other in a predetermined number of steps. When a magnetic field of sufficient magnitude is applied to the quantizing core (Q), it switches from one retentivity point $-\phi r$ to its opposite retentivity point $+\phi r$. The change in magnetic field then produces a fixed change in flux linkage with an output winding associated with the quantizing core (Q). The multistable count core (C) is coupled to the output winding of the (Q) core by means of a closed output circuit or transfer loop which includes a winding magnetically coupled with the count core (C). This switching of the quantizing core (Q) produces an output pulse in the transfer loop which has the effect of increasing the magnetization of the count core (C) from its then state of retentivity toward the next state of retentivity. The counting core is thus stepped by a definite reproducible amount $\Delta\phi$ each time the quantizing core switches from $-\phi r$ to $+\phi r$.

When the count core reaches saturation or the last discrete stable state to which it has been set by repeated switchings of the quantizing core (Q), the circuit coupling the quantizing core (Q) to the count core is arranged so that the next output pulse induced in the output circuit loop by the switching of the quantizing core (Q) will cause a reset of the count core (C) to its initial retentivity state $-\phi r$. Thus if the flux linkage between the quantizing core (Q) and the multistable or count core (C) is such as to cause the count core to reach its last stable state after $n$ switchings of the quantizing core, the $(n+1)^{th}$ switching of the quantizing core Q will cause the count core to be returned to its initial retentivity state.

Figure 4:
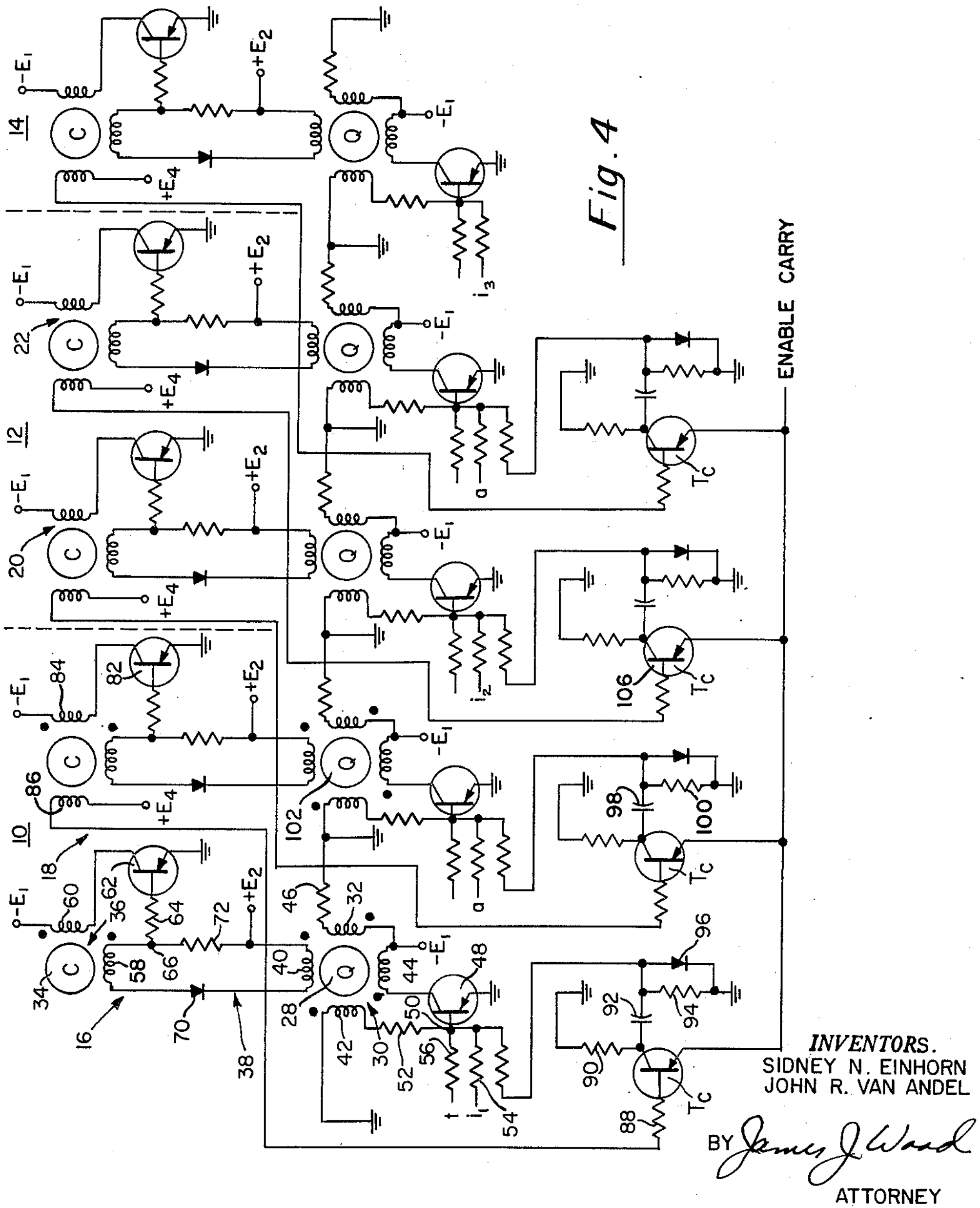
Fig. 4 is a circuit diagram of the improved acculator in accordance with the invention.
Figure 6:
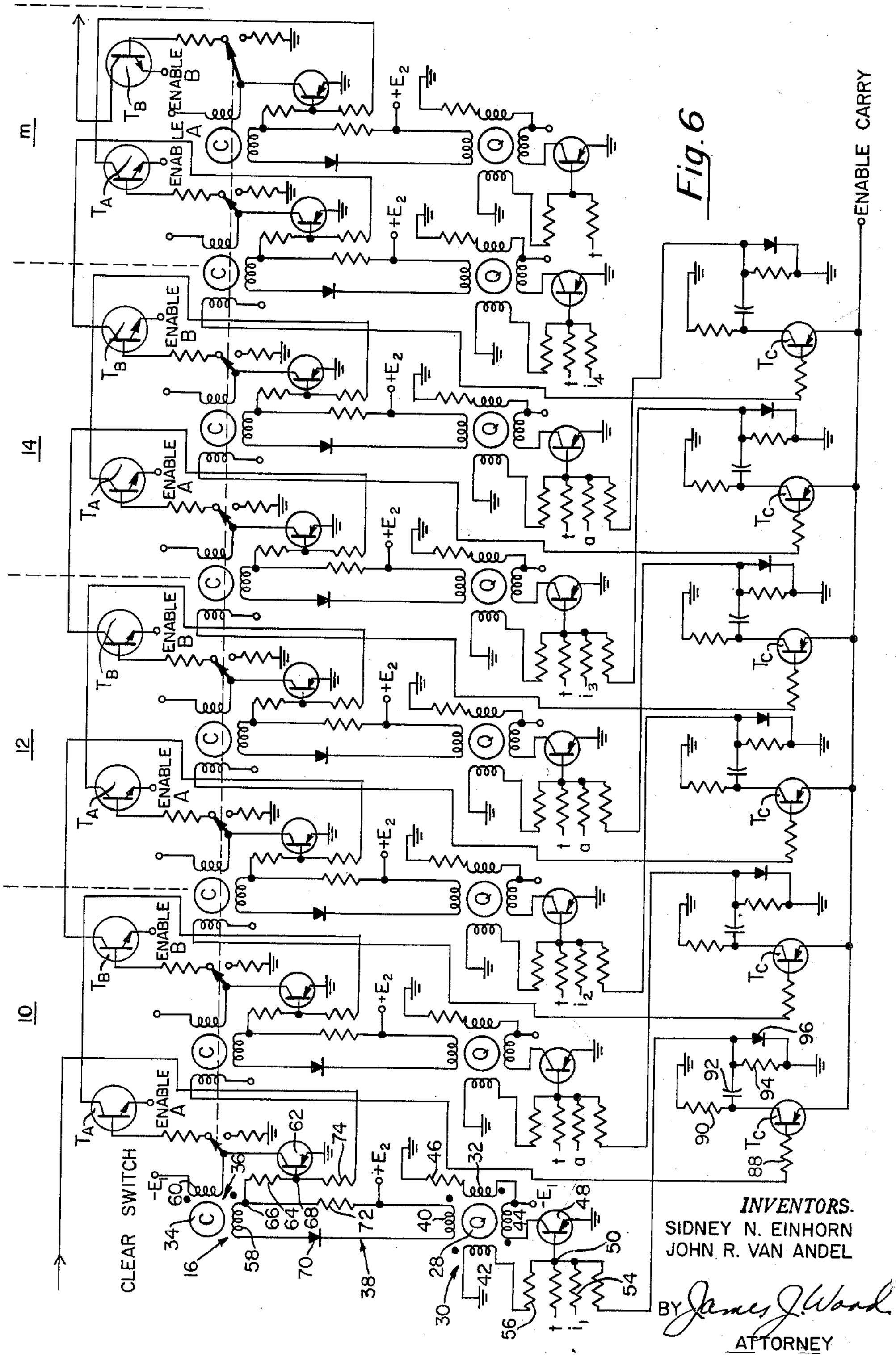
Fig. 6 is a decimal acculating shift register in accordance with the invention.

The teachings of the Chen-Tracy application cited supra are utilized herein to provide a decimal multiple state magnetic step counter utilized as a component in the register embodiments illustrated in Figs. 1, 4, and 6. Since these counters are identical, only one will be described in detail.

The cores 28 and 34 may consist of either a ceramic ferrite material or of an extremely thin ferromagnetic alloy type wound on a non-ferromagnetic spool. Regardless of their composition, they exhibit a very nearly rectangular hysteresis loop. When a core has a $+\phi r$ retentivity it is defined as the "1" or set state; if a core is at $-\phi r$ state it is in the reset or "0" state.

Primary counter 16 has as its main compenents: a quantizing core 28, a blocking oscillator, indicated generally at 30, associated therewith, and a reset winding 32; a counting core 34 and a blocking oscillator, indicated generally at 36, associated therewith; and a transfer loop indicated generally at 38 electromagnetically coupling the quantizing core 28 and the counting core 34.

The quantizing core 28 is a magnetic toroid containing four windings represented schematically at 32, 40, 42 and 44. In the drawings of this application, the dots indicate winding directions, and arbitrarily herein, by definition, the current into a dotted end sets the core in the set or "1" state. Obviously the converse must then be true that current into an undotted end sets the core associated therewith in the reset or "0" state.

The winding 32 is connected at its dotted end to a source of negative potential $-E_1$, while its opposite end is returned to ground through a resistor 46. It will be noted that in keeping with our convention, the winding 32, resistor 46 and voltage $-E_1$ bias the quantizing core 28 in the reset state (0).

The blocking oscillator indicated generally at 30 comprises windings 42 and 44 which, together with the quantizing core 28, constitute a transformer, and transisttor 48 which serves as an amplifying means. This transistor is of the p-n-p type and is arranged in the grounded-emitter configuration, with its collector connected through winding 44 to a source of biasing voltage $-E_1$. The base of transistor 48 is connected to input terminal 50; separate inputs $t$ and $i$, to the base of transistor 48 are provided by means of input resistors 52, 54 respectively which are connected to terminal 50. The terminal 50 is thus the input to the amplifier 48. A feedback path to the input of the amplifier 48 is provided by means of winding 42 which has its undotted end connected to input terminal 50 through resistor 56, the dotted end of which is grounded.

The counting core 34 is provided with windings 58 and 60. The blocking oscillator indicated generally at 36 comprises windings 58 and 60 which, together with counting core 34, constitute a transformer, and a transistor 62 of the p-n-p type which is driven as an amplifier in the grounded emitter configuration. The collector of transistor 62 is connected to a biasing voltage $-E_1$ through the winding 60; the base of transistor 62 is connected to the transfer loop through an input resistor 64 at terminal 66; resistor 64 is connected to the transistor 62 at terminal 68.

The transfer loop 38 comprises a diode 70, winding 40, resistor 72 and winding 58 serially connected so that the forward direction of conduction of the diode 70 is such as to send current into the undotted ends of windings 40 and 58. A source of positive potential $E_2$ is connected to the dotted end of winding 40.

At this point it will be helpful to briefly review the operation of the primary counter 16, the action of all other counters being similar. The blocking oscillator 30 is triggered with a negative spike pulse. Prior to the application of this input pulse, transistor 48 is cut off. Upon the application of the negative going spike pulse, the base of the transistor 48 is driven more negative, causing collector current to flow, the collector potential becoming more positive. The transformer action of windings 42 and 44 in cooperation with quantizing core 28 cause current to flow in winding 42, and through the resistor 56 to the input terminal 50. This action is regenerative in that it tends to drive terminal 50 more negative so that in a very short time transistor 48 saturates. The collector current is into the dotted end of winding 44 and this causes the core to switch to the set state, i.e., it is at "1." The collector to ground voltage is a positive going pulse which is substantially rectangular in shape. The windings 44 and 40 together with quantizing core 28 function as a transformer, and rectangular pulse is induced in output winding 40. The rectangular pulse generated in the winding is of the correct polarity and a current is passed by the diode 70.

It will be recalled that after the quantizing core 28 is switched from $-\phi r$ to $+\phi r$, it is at saturation so that essentially there is no magnetic coupling between windings 42 and 44. The feedback to the base of transistor 48 is decreased, the gain in the feedback loop slips below unity, and the transistor 48 is cut off. The reset bias through winding 32 then takes over and returns the quantizing core 28 to the reset state (0).

The counting core 34 has essentially the same rectangular hysteresis loop as core 28. The introduction of a rectangular pulse into the transfer loop 38 by means of the switching of quantizing core 28 causes the core to be switched a discrete magnitude to its next state of retentivity. If it is assumed that core 34 is in the cleared or reset condition $-\phi r$, a given rectangular pulse applied to the winding 58 will step the core to the next state of retentivity $\phi_1$; the next application of a pulse will advance it to its stable state $\phi_2$, etc.

During this stepping operation, the counting core 34 presents a high impedance. The winding 58 and resistance 72 are serially connected, one end of resistance 72 being maintained at voltage $+E_2$ The voltage induced in the transfer loop 38 is thus dropped across the inductance 58 and the resistor 72. Because of the high impedance presented by the core 34 most of the voltage drop is across the winding 58. The resulting small voltage across resistor 72 is referenced to a positive voltage $+E_2$, and it is insufficient to trigger the blocking oscillator 36.

The transfer loop parameters are such that after nine pulses are applied to winding 58 from winding 40, the counting core 34 is stepped from $-\phi r$ to $+\phi r$, i.e., $-\phi r$, $\phi_1$, $\phi_2$, $\phi_3$ . . . $\phi_7$, $\phi_8$, $+\phi r$. Upon the application of the tenth pulse from the Q core, nearly all the resulting voltage is across resistor 72, because the core in the $+\phi r$ state presents essentially zero impedance. A negative pulse of sufficient magnitude then is applied to the base of transistor 62 and it saturates. The resulting collector current sends current into the undotted end of winding 60 causing the counting core 34 to reset.

The quantizing or Q core is used to provide the counting core (C) with accurate driving pulses. However, it is possible to utilize other sources of driving pulses for the (C) core provided variations in the driving pulses are kept within close tolerances.

An enable gate A is provided between a primary counter and the associated secondary counter in the same stage; an enable gate B is provided between a second counter in one stage and the primary counter in the next adjacent stage. In the embodiment here illustrated, gates A and B comprise n-p-n transistors TA and TB respectively.

Referring to the primary counter 16, its coupling transistor TB is connected to the base input terminal 68 of transistor 62 through resistor 74; the emitter thereof is connected to the terminal marked enable B. Transistor TA is similarly connected, and has its emitter connected to the terminal marked enable A; the base of the latter transistor TA is connected to the collector of transistor 62 through a resistor 76.

The $m^{th}$ stage is coupled to the first stage as follows. The counting core blocking oscillator of $m^{th}$ stage secondary counter is connected to first stage transistor gate TB through a resistance 78 which is connected between the base of TB and the collector of the $m^{th}$ stage second blocking oscillator of the secondary counter; this connection is indicated by the arrows at 80.

The transistor gates TA and TB form a closed loop path so that a signal may be transferred from one primary counter to its associated secondary counter, and from a secondary counter to the adjacent primary counter respectively, depending on the then condition of said transistors as to whether they are enabled or inhibited. As will be presently made clear, the register is designed for shift right around operation. The purpose of the enabling terminology will be made clear in the description which follows.

Figure 2:
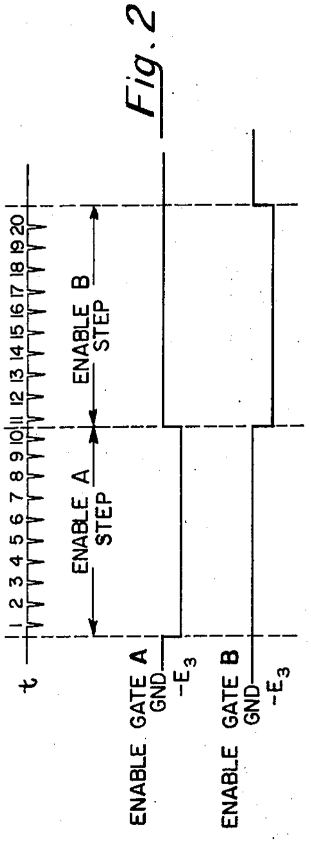

Referring now to Figs. 1, 2 and 3, the register is first cleared by any convenient means not shown in Fig. 1. (One means for doing this will be described in connection with the description of the embodiment shown in Fig. 6.) Let it be assumed that the number 387 is to be inserted in the register. This information is read into the register by applying the appropriate number of pulses to the "$i$" lines; for example, 3 pulses are applied to line $i_1$, 8 to $i_2$, and 7 to $i_3$. Note that the register now has the the number 387 in its memory. Suppose now that for some desired operation a bit shift is required, i.e., shift 387 to read 738, a right across shift. Such a shift is accomplished in two steps which are identified Enable Step A and Enable Step B.

A series of 20 pulses of negative polarity are applied to the $t$ terminals, the first 10 of which are within the time interval defined as Enable Step A, and the second 10 of which are within the time interval defined as Enable Step B. During Enable A, a negative voltage $-E_3$ is applied to the emitters of all the coupling transistors TA, and at the same time the emitters of the coupling transistors TB are held at ground.

Consider now the "3" in the primary counter 16 of the first stage. Upon the application of the 7th pulse, a carry signal is generated which resets counting core 34 as previously described, causing transistor TA of counter 18 to conduct, whereby the secondary counter 18 is cleared or reset.

The clearing or Resetting of secondary counter 18 is accomplished as follows: When transistor 62 conducts, the collector thereof is very near zero or ground potential. This means that the base of transistor TA is very nearly at ground, but since the emitter is at a negative potential $-E_3$, the base is positive with respect to the emitter and conduction takes place. A negative going pulse is applied to the base of the transistor 82 of the second blocking oscillator. The conduction of transistor 82 sends a current through winding 84 which resets the secondary core 18. During the next three pulses, both the primary and secondary counters 16, 18, are stepped 3 times as they read "3."

During enable step B, the coupling transistor gates TA are switched to ground, while the coupling transistors TB are shifted to $-E_3$. In this condition the transistors TA are inhibited, and the transistors TB are enabled.

The next set of ten additional *t* pulses (11–20 in Fig. 2) are applied to all the quantizing cores (Q) of all the counters. The primary counters will develop a carry signal on the $(10-n)^{th}$ *t* pulse (here counting the 11th pulse as the first of a new set of ten) but they will have no effect on the adjacent secondary counters because of the fact transistors TA are inhibited.

Upon the application of the 11th pulse, the primary and secondary counters of the second stage are both in the "9" state. When the 12th pulse is applied, a carry signal is developed; the carry signal of counter 22 is applied to the adjacent primary counter 24 causing it to clear or reset. The action continues until at the conclusion of the second or B shifting step, the register is in the state indicated in Fig. 3 and reading 738 in its primary counters 16, 20 and 24. The intermediate step by step transfer of the information through the register may be obtained from a study of the table below:

| | 1st Stage | | 2nd Stage | | 3rd Stage | |
|---|---|---|---|---|---|---|
| | Pri | Sec | Pri | Sec | Pri | Sec |
| "387" inserted | 3 | 0 | 8 | 0 | 7 | 0 |
| *t* pulse: | | | | | | |
| 1 | 4 | 1 | 9 | 1 | 8 | 1 |
| 2 | 5 | 2 | 0 | 0 | 9 | 2 |
| 3 | 6 | 3 | 1 | 1 | 0 | 0 |
| 4 | 7 | 4 | 2 | 2 | 1 | 1 |
| 5 | 8 | 5 | 3 | 3 | 2 | 2 |
| 6 | 9 | 6 | 4 | 4 | 3 | 3 |
| 7 | 0 | 0 | 5 | 5 | 4 | 4 |
| 8 | 1 | 1 | 6 | 6 | 5 | 5 |
| 9 | 2 | 2 | 7 | 7 | 6 | 6 |
| 10 | 3 | 3 | 8 | 8 | 7 | 7 |
| 11 | 4 | 4 | 9 | 9 | 8 | 8 |
| 12 | 5 | 5 | 0 | 0 | 0 | 9 |
| 13 | 0 | 6 | 1 | 1 | 1 | 0 |
| 14 | 1 | 7 | 2 | 2 | 2 | 1 |
| 15 | 2 | 8 | 3 | 3 | 3 | 2 |
| 16 | 3 | 9 | 4 | 4 | 4 | 3 |
| 17 | 4 | 0 | 0 | 5 | 5 | 4 |
| 18 | 5 | 1 | 1 | 6 | 6 | 5 |
| 19 | 6 | 2 | 2 | 7 | 7 | 6 |
| 20 | 7 | 3 | 3 | 8 | 8 | 7 |

A three stage accumulator is shown in Fig. 4. With the exception of the primary counter of stage 1, all the count cores are provided with a third winding. In the interest of simplicity, only the first stage will be described.

The secondary counter 18 is provided with a third winding 86, one each of which is connected to a source of positive potential $+E_4$, and the other end is connected to the base of a transistor identified as TC through a resistor 88. The transistors labelled TC on the drawing are for carry propagation, and all are similarly connected to the third winding on the counting cores.

The transistor TC of secondary counter 18 has its collector connected to ground through a resistor 90. A differentiating circuit comprising capacitor 92 and resistor 94 is connected between the collector of TC and ground; the resistor 94 is shunted by a diode 96, the parallel combination 94, 96 being connected at its ungrounded end to input terminal 50.

The emitters of transistors TC are connected in common to the terminal marked Enable Carry. A sufficiently positive voltage applied to the Enable Carry terminal will enable the transistors TC, i.e., the transistors will be placed in such condition that a signal applied to their bases will cause conduction in the saturation region.

Completing the description of Fig. 4, the secondary counters of each stage are provided with an additional input signal to be applied at terminals "*a*" through a suitable resistor. The secondary counter of the $m^{th}$ stage has been eliminated because its inclusion would be superfluous.

The operation of the accumulator will best be understood by a detailed consideration of its operation in the following two examples. The results are tabulated in Fig. 5. Consider now Example 1, where 387 is to be added to 431.

First, a positive voltage of sufficient magnitude is applied at the Enable Carry terminal. Next the count cores are cleared in any suitable manner such as illustrated in Fig. 6. The three digit word 387 is inserted as previously explained at the terminals $i_1$, $i_2$ and $i_3$. The word 431 is next inserted in the same manner.

In a given stage *m*, other than the first, if a carry is generated by the primary counter, a negative voltage is induced in its added winding which is applied to the base of the gate TC to which it is connected.

Since the transistors TC are connected in the common emitter configuration, the signal applied to the base thereof is inverted at the collector. The pulse appearing at the collector is then differentiated by the RC-network, i.e., 98, 100 of the second stage, and the trailing edge is used to trigger the associated quantizing core of the secondary counter, i.e., core 102 of the first stage 10.

Applying this to the situation where the second number 431 is inserted, the "1" applied to "7" in the third stage changes the primary counter to an "8." The three on line $i_2$ clears the primary counter 20 and then drives it to the one state; as the counter is cleared a negative pulse is induced in winding 104 which is then applied to the base of the associated TC transistor, and then through the differentiating network 98, 100, to the quantizing core 102 of the secondary counter 18. This places a "1" in secondary counter 18. Finally the four pulses applied at $i_1$ step up the primary counter 16 to the 7 state.

Next nine "*a*" pulses are applied to all the secondary counters at the inputs marked "*a*." In the particular example chosen, this causes a 9 to be inserted in the secondary counter of the second stage. The nine "*a*" pulses applied to the secondary counter 18 causes a carry signal to be generated which is applied to the base of the coupling transistor TC. By means of the differentiating circuit 92, 94, the pulse is differentiated and applied to the primary counter 16, changing the 7 to an 8. The correct sum 818 thus appears in the primary counters, reading from left to right. The 9 in the secondary counter of the second stages does not matter since it is merely used to develop a carry signal. The sum has now been completed, and the secondary count cores are cleared, leaving the desired answer in the primary counters.

It should be noted in the second example depicted in Fig. 5, the application of the 9 "*a*" pulses initiates a spontaneous ripple of carries. It is essential that the set and reset cycle of the first stage secondary counter quantizing core 102 (which is triggered by the 9th "*a*" pulse) be completed before the differentiated carry pulse initiated from the second stage secondary counter 22 is propagated to the base of the first stage transistor 106. Sufficient delay is provided by differentiating the output of all carry pulses and utilizing only their trailing edges.

The shifting and accumulating principles previously described are utilized to provide the four stage accumulating decimal shift register shown in Fig. 6. The operation of this register is obvious and only a few brief remarks are necessary.

In order to perform a shift of the information in the register, the carry enable transistors TC, are inhibited and the register is operated just as described in connection with the embodiment of Fig. 1. For accumulation, both sets of shift enable transistor TA and TB are cut off, and the procedure is the same as that described in connection with the accumulator shown in Fig. 4.

The provision for clearing the counting cores is shown symbolically as a switch which effectively places the collector of the transistor to which it is connected, at ground, thereby causing a current to flow through the reset winding. However, any convenient method for providing a reset pulse may be used.

Since the register is operating within the decimal notation, twenty $t$ pulses are required for a shift operation. Hence if the "$t$" pulse frequency is 100 kc., the shifting frequency is 5 kc.

Further, a minimum time interval must also be specified for successive addition or accumulation to allow time for carry propagation as previously pointed out in connection with the description of Fig. 5.

The input and output of these registers are in the pulse count code, and may be bit serial, decimal serial or bit serial, decimal parallel.

The selection of either n-p-n or p-n-p transistors in the practice of this invention is not critical provided due attention is paid to the polarity of the triggering pulses and to the polarity of the biasing potentials.

Obviously many modifications and variations of the present invention are possible in the light of the above teachings. It is therefore to be understood that within the scope of the appended claims the invention may be practiced other than as specifically described and illustrated.

We claim:

1. A decimal shift register comprising a plurality of stages 1, 2, . . . $m$, each stage comprising a primary and secondary magnetic count core, each core having multiple stable states and being capable of being switched from one state of saturation (reset) to the other state of saturation (set) in a predetermined number of steps, a discrete step representing a digit bit $n$ where $n$ may have any value 0, 1, 2, 3 . . . 9, input signal means "$i$," . . . $i_m$" coupled to said primary count cores 1 . . . $m$ for storing a word of $m$ bits in said register, an enable gate A coupled between a primary count core and its adjacent secondary count core within the same stage, and an enable gate B between a secondary count core in one stage and the primary count core in the next adjacent stage, including between the secondary count core of the "$m^{th}$" stage and the primary count core of the first stage, the whole arranged to form a closed shift loop, means for applying timed pulses to said primary and secondary count cores, the first ten pulses being defined as enable step A, the second ten being defined as enable step B, means for enabling gate A during enable step A and for enabling gate B during step B, whereby during enable step A the $(10-n)^{th}$ pulse to a given secondary count core in any stage resets said latter core, the remaining $n$ pulses storing the number $n$ in both primary and secondary count cores, and during enable step B the $(10-n)^{th}$ pulse providing a signal through enable gate B for resetting a secondary count core and the primary count core to which it is coupled, so that any digit $n$ stored in a secondary count core is shifted to the adjacent primary count core in the direction of loop shift.

2. A decimal augend register for accumulating successive additions with different addends, comprising a plurality of stages 1, 2, . . . $(m-1)$, $m$, each of said stages 1, 2, 3, . . . $m$ comprising a primary magnetic count core, and each stage 1 . . . $(m-1)$ comprising a secondary magnetic count core, each core having multiple stable states and being capable of being switched from one state of saturation (reset) to the other state of saturation (set) in a predetermined number of steps, a discrete step representing a digit bit $n$ where $n$ may have a value of 0, 1, 2 . . . 9, input means $i_1$, $i_2$, . . . $i_m$, and input means "$a$" coupled to said primary magnetic count cores and said secondary magnetic cores respectively, for stepping a core from one stable state of remanence to the next, delay gating means responsive only to a carry signal "1" coupling each count core with the input means associated with the next adjacent count core in a unidirectional shift, means to enable and disable said delay gating means, whereby upon the application of digital signal pulses to said input means "$i_1$" . . . $i_m$ a word is stored having $m$ bits, the successive insertion of two words producing a carry signal from an $m^{th}$ primary counter to an $m-1$ secondary counter upon the application of any tenth pulse to a primary count core, and upon the application of nine pulses to said input means "$a$," a carry signal "1" is produced whenever any magnetic core receives a tenth pulse, the delay gating means providing a predetermined time delay to permit completion of the set and reset cycle of a given counting core before the transmission of any carry signals, whereby the word stored in the primary count cores represent the addition of the said two words.

3. A decimal accumulating shift register comprising a plurality of stages 1, 2, 3 . . . $(m-1)$, $m$ each of said stages comprising a primary magnetic count core and a secondary magnetic count core, each core having multiple stable states and being capable of being switched from one state of saturation called reset, to the other state of saturation called set, in a predetermined number of steps, a discrete step representing a digit bit $n$ where $n$ may have any value 0, 1, 2, . . . 9, input signal means $i_1$, $i_2$, . . . $i_m$ coupled to said primary count cores 1, 2, . . . $i_m$ respectively for storing a word of $m$ bits in said register, input means "$a$" coupled to said secondary magnetic count cores 1, 2, . . . $(m-1)$, an enable gate A between a primary magnetic count core and a secondary magnetic count core in the same stage, an enable gate B between a secondary count core in the $(m-1)^{th}$ stage and the primary count core in the $m^{th}$ stage, and including an enable gate B between the $m^{th}$ stage secondary count core and the primary magnetic count core of the first stage to form a closed shift loop, means for applying timed pulses to said primary and secondary count cores, the time interval of the first ten pulses being defined as enable step A, the time interval for the second ten pulses being defined as enable step B, means for enabling gate A and inhibiting gate B during enable step A, and conversely during enable step B, whereby in a shifting operation during enable step A, in a stage, the $(10-n)^{th}$ pulse to the primary count core in said stage, resets the latter core and also the secondary count core, the remaining $n$ pulses storing the number $n$ in both primary and secondary magnetic count cores, and during enable step B, the $(10-n)^{th}$ pulse provides a signal through enable gate B resetting the secondary magnetic count core and the primary magnetic count core to which it is coupled, the remaining pulses resulting in a shift by storing any digit $n$ in a secondary count core and in the adjacent primary magnetic count core in the direction of loop shift, delay gating means responsive only to a carry signal "1" coupling an "$m$" primary count core with an $(m-1)$ secondary count core in a unidirectional shift, means to enable and disable said delay gating means during an addition operation, whereby upon the successive insertion of two words for addition a carry signal is produced from an $m^{th}$ primary counter to an $(m-1)^{th}$ secondary counter upon the application of any tenth pulse to a primary core, and upon the application of nine pulses to said input means "$a$," a carry signal "1" is produced whenever any magnetic core receives a tenth pulse, the delay gating means providing a predetermined time delay to permit completion of the set and reset cycles of the counting cores before the transmission of said carry signal "1," whereby the bits stored in the primary count cores represent the sum of said two successive words applied to the register.

4. A register according to claim 1 wherein the coupling to each count core includes a quantizing core, said quantizing core comprising an input winding, an output winding and a reset winding, said input winding being adapted to receive said timed pulses, the input winding of the quantizing cores coupled to said primary count cores being additionally coupled to said input signal means $i_1$, $i_2$ . . . $i_m$ respectively, said output winding being coupled to said each count core for applying a signal thereto, the application of single pulse to said input winding driving said quantizing core from one state of saturation (reset) to the other state of saturation (set) to provide a driving pulse in said output winding, and triggered means applied to said reset winding for returning said quantizing core to the reset state.

5. A register according to claim 2 wherein the coupling to each count core includes a quantizing core, said quantizing core comprising an input winding, an output winding and a reset winding, said input winding being connected to said delay gating means and being adapted to receive said timed pulses, the input winding of the quantizing core coupled to said primary count cores being additionally coupled to said input signal means $i_1$, $i_2$, $i_3$ . . . $i_m$ respectively, the input winding of the quantizing core coupled to said second count cores being additionally coupled to said input means $a$, said output winding of the quantizing core being coupled to said each count core for applying a signal thereto, the application of a single input pulse driving said quantizing core from one state of saturation (reset) to the other state of saturation (set), to provide a driving pulse in said output winding, and trigger means applied to said reset winding for returning said quantizing core to the reset state.

6. A register according to claim 1 including means for clearing all count cores.

7. A register according to claim 2 including means for clearing all count cores.

8. A register according to claim 3 including means for clearing all count cores.

9. A decimal shift register comprising a plurality of stages 1, 2, . . . $m$, each stage comprising a primary and secondary magnetic count core, each core having multiple stable states and being capable of being switched from one state of saturation (reset) to the other state of saturation (set) in a predetermined number of steps, a discrete step representing a digit bit $n$ where $n$ may have any value 0, 1, 2, 3 . . . 9, input signal means "$i$ . . . $i_m$" coupled to said primary count cores 1 . . . $m$ for storing a word of $m$ bits in said register, an enable gate A coupled between a primary count core and its adjacent secondary count core within the same stage, and an enable gate B between a secondary count core in one stage and the primary count core in the next adjacent stage, including between the secondary count core of the "$m^{th}$" stage and the primary count core of the first stage the whole being arranged to form a closed shift loop, means for applying timed pulses to said primary and secondary count cores, the first ten pulses being defined as enable step A, the second ten being defined as enable step B, said enable gate A comprising a transistor having a base, a collector and an emitter, and said enable gate B comprising a transistor having a base, collector and an emitter, means for applying potentials to said emitters so as to cut off the transistor of enable gate B during enable step A and enable the transistor of enable gate A, and conversely during enable step B, means for coupling signals from a counting core to the base of said transistors, and means connecting the collectors of said transistors with said count cores, whereby during enable step A the $(10-n)^{th}$ pulse to a given secondary count core in any stage resets said latter core, the remaining $n$ pulses storing the number $n$ in both primary and secondary count cores, and during enable step B the $(10-n)^{th}$ pulse providing a signal through enable gate B for resetting a secondary count core and the primary count core to which it is coupled, so that any digit $n$ stored in a secondary count core is shifted to the adjacent primary count core in the direction of loop shift.

10. A register according to claim 2 wherein said delay gating means comprises a transistor having a base, a collector and an emitter, and a differentiating circuit, means for applying a potential to said emitter to enable said transistor to conduct, means for applying said carry signal to the base of said transistor to cause conduction, said differentiating circuit comprising a capacitor and a resistor serially connected, the capacitor being coupled to said collector, a diode shunting said resistor, the output of said differentiating circuit developed across said resistor being applied to both said input means.

11. A register according to claim 2 comprising an added winding on said count cores for developing said carry signal, said delay gating means comprising a transistor having a base, a collector and an emitter, and a differentiating circuit, means for applying a potential to said emitter to enable said transistor to conduct, means for applying said carry signal to the base of said transistor to cause conduction, said differentiating circuit comprising a capacitor and a resistor serially connected, the capacitor being coupled to said collector, a diode shunting said resistor, the output of said differentiating circuit developed across said resistor being applied to both said input means.

No references cited.